United States Patent

Proctor

[15] 3,648,674
[45] Mar. 14, 1972

[54] REACTOR
[72] Inventor: Gordon L. Proctor, Tulsa, Okla.
[73] Assignee: Gordon L. Proctor, Incorporated, Tulsa, Okla.
[22] Filed: Feb. 27, 1970
[21] Appl. No.: 14,982

Related U.S. Application Data

[63] Continuation-in-part of Ser. No. 349, Jan. 2, 1970, abandoned.

[52] U.S. Cl............................123/141, 123/119 F, 123/127, 123/131
[51] Int. Cl..................................F02m 29/04, F02m 29/14
[58] Field of Search..................123/131, 141, 119 F, 127

[56] References Cited

UNITED STATES PATENTS 2,618,541  11/1952  Aleman et al.....................123/141 X
2,977,205  3/1961   Austin..............................123/141 X
2,994,312  8/1961   Elfes et al........................123/119 F
3,437,467  8/1969   Jacobus...........................123/141 X
3,449,098  6/1969   Larson, Sr........................123/141 X

FOREIGN PATENTS OR APPLICATIONS 580,700  9/1946  Great Britain.........................123/141
451,559  10/1927 Germany...............................123/141

Primary Examiner—Wendell E. Burns
Attorney—Mason, Kolehmainen, Rathburn & Wyss

[57] ABSTRACT

A reactor grid is positioned within the passageway between the intake manifold and carburetor of an internal combustion engine positioned to intercept streams of larger size particles of fuel which generally form around the edges of the throttle butterfly valve. These larger size particles impinge upon the grid, thereby breaking up the particles. The reactor grid may be placed in an expansion chamber which further aids in vaporizing and breaking up the liquid particles of fuel.

15 Claims, 11 Drawing Figures

Patented March 14, 1972
3,648,674
3 Sheets-Sheet 1
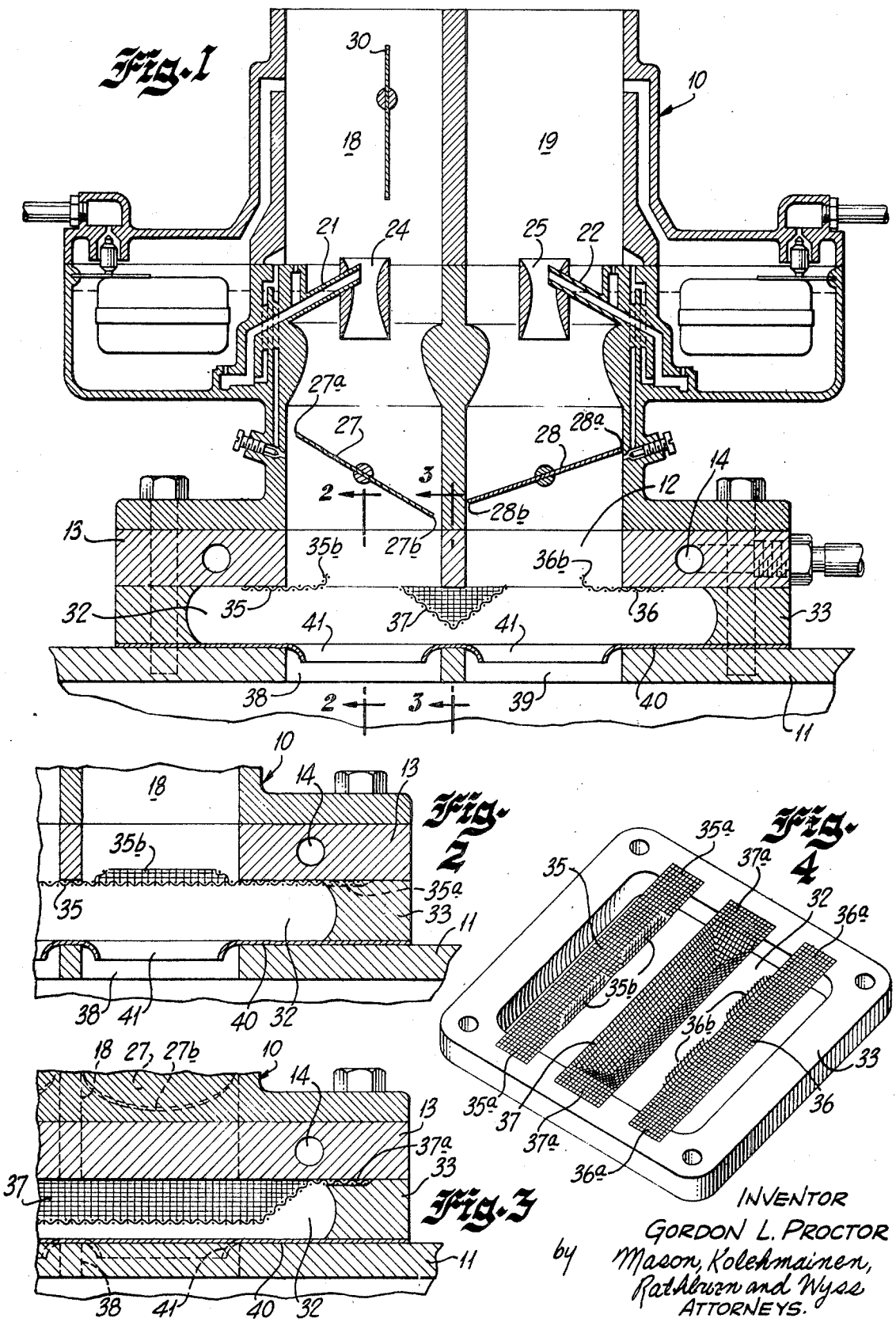
INVENTOR
GORDON L. PROCTOR
by Mason, Kolehmainen,
Rathburn and Wyss
ATTORNEYS.

Patented March 14, 1972
3,648,674
3 Sheets-Sheet 2
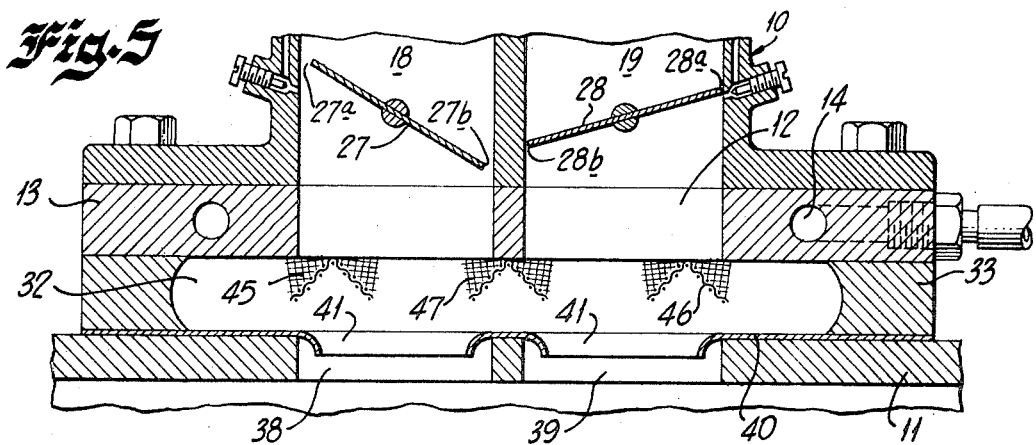
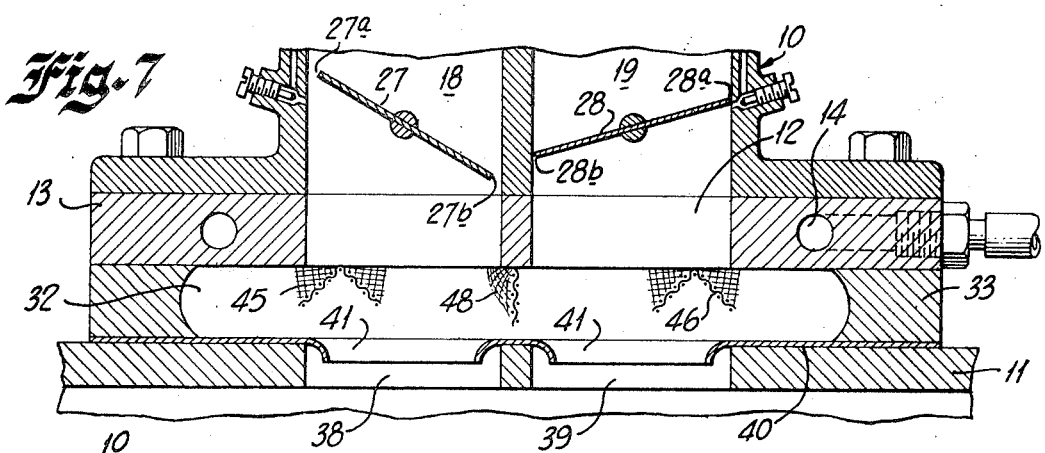
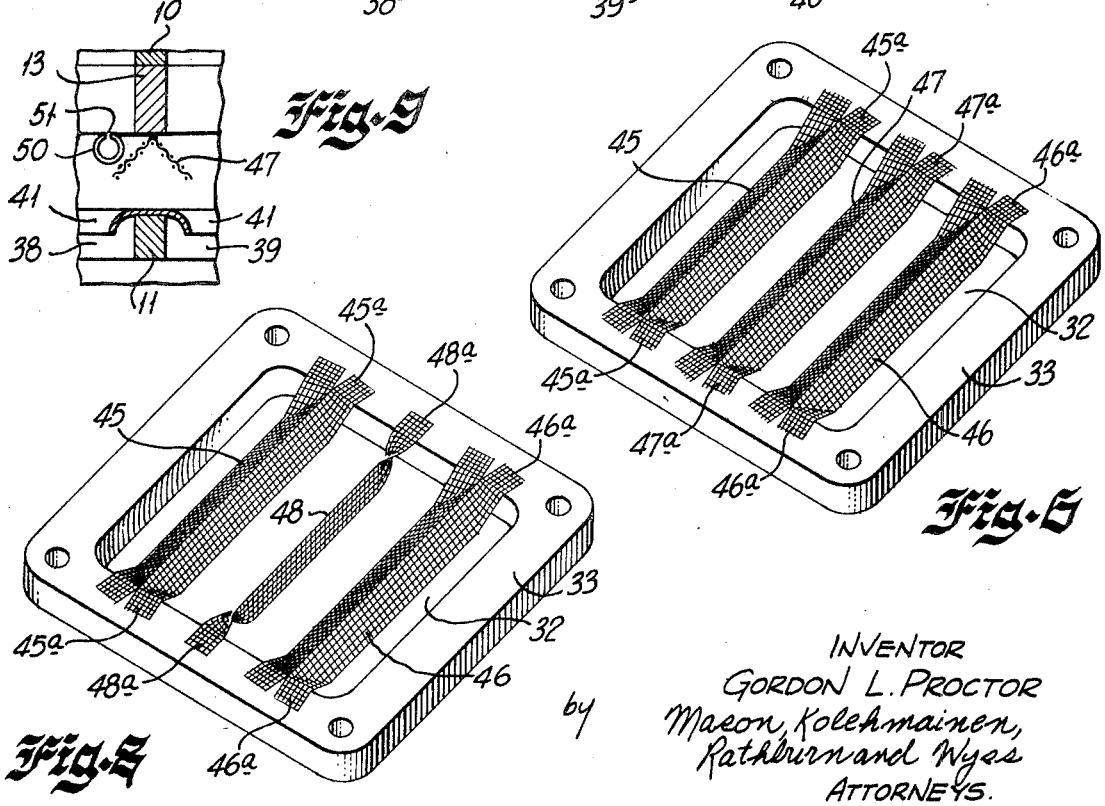
INVENTOR
GORDON L. PROCTOR
Mason, Kolehmainen,
Rathburn and Wyss
ATTORNEYS.

Patented March 14, 1972
3,648,674
3 Sheets-Sheet 3
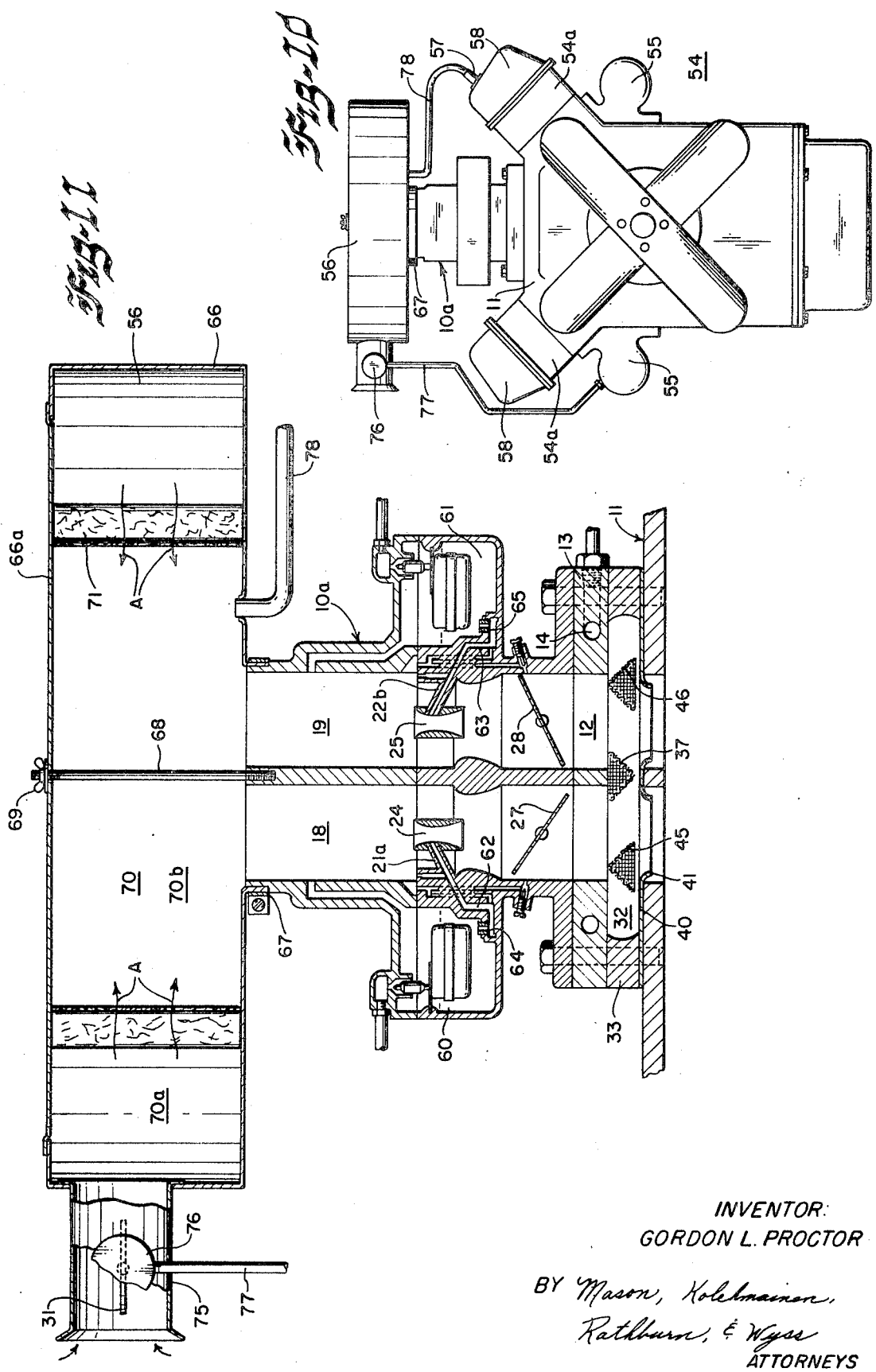
INVENTOR:
GORDON L. PROCTOR
BY Mason, Kolehmainen,
Rathburn, & Wyss
ATTORNEYS

REACTOR

This application is a continuation-in-part of my then copending application Ser. No. 349 filed Jan. 2, 1970, now abandoned which is assigned to the same assignee.

The present invention relates to an improved reactor for an internal combustion engine, and more particularly, to an arrangement which improves the uniformity of the fuel and air mixture in an internal combustion engine.

Under present design of internal combustion engines, a nonuniform mixture of fuel-air is delivered to the cylinders. Accordingly a richer fuel-air mixture is provided by the carburetors so that even and consistent power is obtained. However such rich mixture not only decreases fuel economy but exhausts larger amounts of unburned fuel.

Heretofore various arrangements of baffles, compressors, impellers and the like have been inserted in various places to provide optimum atomization of the fuel-air mixture. However such gains have been small and have not generally received commercial acceptance. Carbon monoxide which is very soluble at normal pressure and temperature conditions can be used as a fuel and burned in the exhaust area where temperature and pressure are adequate by the addition of air, and some small reduction may be and is being achieved by injecting air into an exhaust manifold burner. This also provides a small reduction in the amount of unburned materials in the exhaust but appears to increase the corrosive effects on the exhaust manifolds, pipes, mufflers and the like.

Accordingly it is an object of the present invention to provide an improvement in an internal combustion engine which will improve the vaporization or atomization of the fuel in the fuel-air mixture going to the cylinders and accordingly provide improved economy and decrease the unburned contaminants discharged from the exhaust.

Another object of the present invention is to provide a means for improving the vaporization or dispersion of fuel in a fuel-air mixture for an internal combustion engine.

A further object of the present invention is to provide means for improving the efficiency of an internal combustion engine.

Yet a further object of the present invention is to provide a means for reducing unburned fuels exhausted from an internal combustion engine.

In accordance with these and other objects, there is provided a reactor grid in the passageway between the carburetor and intake manifold of an internal combustion engine wherein larger size particles of fuel in the fuel-air mixture impinge upon the reactor grid and are broken up or reduced in size.

In accordance with another feature of the present invention, there is provided an expansion chamber which is effective to provide vaporization and mixing of the fuel and air in the passageway between the carburetor and intake manifold. Advantageously the reactor grid is positioned in or at the entrance to the expansion chamber.

It has been observed from a study of fuel distribution that rather well defined streams of fuel-air containing larger sized particles of fuel form from the leading and trailing edges of the throttle butterfly valve in a conventional carburetor. This may be due in part to the wetting of the throttle butterfly valve by the fuel in an atomized fuel-air mixture, with collection and reentry of the wetted particles in the airstream around the leading and trailing edges of the throttle butterfly valve. In any event it has been found that placement of the reactor grid in an area whereby the particles impinge upon the grid will effectively provide better mixing and atomization of the fuel-air mixture.

The reactor grid does not completely interrupt the flow as such an arrangement would cause restriction and a richer mixture unless resistance to the flow due to the area of impingement were adequate. It has been found that an expansion chamber having approximately a 2 to 1 relationship with the area of the carburetor induction tube or tubes, with the reactor grid placed only in the area determined by the large sized particle concentration flow of the fuel-air mixture will result in optimum performance. The reactor grid aids in the reduction of particle size, or globules of fuel not uniformly mixed with air, and assists in causing the mixture in the preliminary expansion chamber to benefit from distribution, wetting and vaporization. In accordance with the present invention such fuel particles passing around the edges of the throttle valves 27 and 28 will be more completely broken up and mixed or united with the air regardless of their cause or origin.

In accordance with the present invention, an expansion chamber 32 is defined in the passageway 12 by a housing 33. In accordance with the present invention suitable reactor grids are placed within the expansion chamber in a plane approximately perpendicular to the direction of flow of the fuel-air mixture intercepting the streams of the larger size particles of fuel. Thus in the illustrated multibarrel carburetor, generally flat screens 35 and 36 are positioned downstream of the upper edges 27a, 28a of the throttle valves 27 and 28. In addition an intermediate screen 37 is positioned downstream of the lower edges 27b and 28b of the throttle valves 27 and 28. In the illustrated embodiment the screens 35 and 36 have their outer edges flattened, as illustrated at 35a, 36a, FIGS. 2 and 4, and have upwardly bent flange portions 35b, 36b extending upwardly into the respective induction tubes of the carburetor 10. As is conventional, the insulating block 13 is made of somewhat resilient material, and the housing 33 may also be made of somewhat resilient material, so that the edge portions 35a, 36a may be squeezed between the insulator 13 and the housing 33. The grid screen 37 is formed in a general V-shape with its end portions 37a deformed longitudinally thereof to be supported The fuel-air mixture is regrouped at the induction port entrance to the intake manifold and an increase in velocity takes place before entering the intake manifold. Upon rushing into the manifold area, expansion again takes place with further vaporization and preparation for maximum power utilization of the fuel when burned.

Moreover the invention is equally applicable to all types of fuel systems and "carburetor" as herein used is intended to apply to injection type systems as well as to aspirating type devices.

For a better understanding of the present invention, reference may be had to the accompanying drawings wherein:

FIG. 1 is a cross-sectional view of the present invention, as applied to a conventional downdraft four-barrel carburetor;

FIG. 2 is an enlarged fragmentary cross-sectional view of the apparatus of FIG. 1, taken along line 2—2 of FIG. 1;

FIG. 3 is an enlarged fragmentary cross-sectional view of the carburetor of FIG. 1, taken along line 3—3 of FIG. 1;

FIG. 4 is a perspective view of the reactor grid and expansion chamber of FIG. 1;

FIG. 5 is a cross-sectional view of another embodiment of the invention applied to a conventional four-barrel downdraft carburetor, fragmentarily illustrated therein;

FIG. 6 is a perspective view of the expansion chamber and reactor grids of FIG. 5;

FIG. 7 is a cross-sectional view of yet another embodiment of the present invention illustrated as applied to a conventional four-barrel downdraft carburetor, fragmentarily illustrated;

FIG. 8 is a perspective view of the expansion chamber and reactor grids of FIG. 7;

FIG. 9 is a fragmentary cross-sectional detail view of yet another embodiment of the present invention;

FIG. 10 is the front view of an internal combustion engine embodying the present invention; and FIG. 11 is a cross-sectional view of a carburetor and air filter according the the embodiment of FIG. 10.

Referring now to the drawings, and particularly to the embodiment of FIGS. 1 through 4, the invention is illustrated as applied to an internal combustion engine having a carburetor 10 mounted on an intake manifold 11. A passageway 12 is defined between the intake manifold 11 and carburetor 10 by a spacer-insulator block 13 in a known manner. Cooling fluid from the engine may be circulated through tube structure 14, if desired.

The carburetor 10 may be of any suitable type, and may include known single- and multi-barrel aspiration type carburetors, as well as induction type carburetors. However, in the illustrated embodiment there is shown a known type of four-barrel downdraft carburetor 10, illustrated in cross section and showing only one pair of induction tubes, including a low speed side 18 and a high speed side 19. It is understood that in a four-barrel carburetor, a second, similar set of induction tubes is arranged in side by side relation to the illustrated set. Airflow through the induction tubes 18 and 19 creates an aspiration of fuel through a pair of fuel jets 21 and 22, each opening within an induction or aspiration nozzle or venturi 24 and 25. Each of the induction tubes 18 and 19 is controlled respectively by a throttle valve 27 and 28 of the butterfly type positioned on the downstream side of the venturis 24 and 25. In addition, the low speed induction tube 18 includes a choke valve 30 positioned on the upstream side of the venturi 24. As is common in multi-barrel carburetors, the low speed tube 18 is operative throughout the operating speed range of the internal combustion engine while the high speed tube 19 is ineffective at low speed operation of the engine. Accordingly, the throttle valve 27 in the low speed side of the carburetor 10 will open in response to initial movement of the engine accelerator control, while the high speed throttle valve 28 will remain closed until higher throttle settings are made.

It has been found by tests that the upper surface of the throttle valves 27 and 28 are wetted by the impingement of the fuel-air mixture from the venturis 24 and 25. The wetted fuel will collect in droplets and will be entrained in the high velocity stream passing by the upper or upstream edges 27a, 28a and lower or downstream edges 27b, 28b of the respective throttle valves 27 and 28. Moreover, during the aspiration process in the venturis 24 and 25, fuel particles may be entrained within the airflow. Accordingly in accordance with the present invention such fuel particles passing around the edges of the throttle valves 27 and 28 will be more completely broken up and mixed or united with the air regardless of their cause or origin.

In accordance with the present invention, an expansion chamber 32 is defined in the passageway 12 by a housing 33. In accordance with the present invention suitable reactor grids are placed in a plane approximately perpendicular to the direction of flow of the fuel-air mixture intercepting the streams of the larger size particles of fuel. Thus in the illustrated multi-barrel carburetor, generally flat screens 35 and 36 are positioned downstream of the upper edges 27a, 28a of the throttle valves 27 and 28. In addition an intermediate screen 37 is positioned downstream of the lower edges 27b and 28b of the throttle valves 27 and 28. In the illustrated embodiment the screens 35 and 36 have their outer edges flattened, as illustrated at 35a, 36a, FIGS. 2 and 4, and have upwardly bent flange portions 35b, 36b extending upwardly into the respective induction tubes of the carburetor 10. As is conventional, the insulating block 13 is made of somewhat resilient material, and the housing 33 may also be made of somewhat resilient material, so that the edge portions 35a, 36 a may be squeezed between the insulator 13 and the housing 33. The grid screen 37 is formed in a general V-shape with its end portions 37a deformed longitudinally thereof to be supported between the spacer-insulator 13 and the casing 33. The larger fuel particles will flow generally downwardly from the edge portions 27a and 27b, 28a and 28b, to impinge upon the grid screens 35, 36 and 37. In addition, at low speed operation, some fuel-air mixture flow will cross from the low speed tube 27 through the expansion chamber 32, so that fuel-air mixture will enter the intake manifold 11 through intake inlets 38 and 39. Fuel particles crossing through the expansion chamber will be directed against the intermediate grid screen 37.

A regrouping device 40 of sheetmetal material is in the expansion chamber ahead of the intake manifold 11 and brings the fuel and air together in a greatly improved manner before they enter the intake manifold for distribution without lessening or restricting the flow and normal aspiration of the engine. Consequently, the regrouping device 40 enhances uniformity and the engine produces more power from a given amount of fuel. In the illustrated embodiment, the regrouping device is formed of sheet metal, with a plurality of flanged openings 41 opening into the inlet openings 38, 39 of the intake manifold 11.

From the above detailed description, the operation of the improved arrangement is believed clear. However, briefly, it will be understood that the streams of larger particle sizes are directed against reactor grid screens placed in the path of such streams. The reactor grid lies in a plane approximately 90° to the direction of the flowing fuel mixture, and does not completely interrupt the flow. Moreover, the reactor screens are placed in an expansion chamber having an area approximately double that of the induction tubes. The grid aids in the reduction of particle size, or globules of fuel not uniformly mixed with air, and assists in causing the mixture in the preliminary expansion chamber to benefit from distribution, wetting and vaporization. By providing an open area where the barrels of the carburetor discharge for a rapid, high speed increase, there is no sacrifice in the normal aspiration requirements. The fuel-air mixture is regrouped at the induction port entrance to the intake manifold by the regrouping device 40. Here an increase in velocity takes place before entering the intake manifold. Upon rushing into the manifold area, expansion again takes place with further vaporization and preparation for maximum power utilization of the fuel when burned. The uniformity at the engine produces more power from a given amount of fuel with a very significant smoothing out of the engine since each contributing power stroke is more nearly the same. Moreover, smaller metering jets in an aspiration type carburetor, or smaller quantities of fuel in an injection type carburetor, may be used because of that which heretofore was wasted in nonuniform mixing of the fuel and air. The result is cleaner, more complete burning, more uniform engine temperature, reduced carbon, reduced corrosion, longer valve, and exhaust system life. Moreover there is provided significantly improved fuel economy and a cleaner burning engine with less contamination from the exhaust.

Referring now to the embodiment of FIGS. 5 and 6, there is illustrated an arrangement wherein a different configuration of reactor grid screens is used. Otherwise the embodiment of FIGS. 5 and 6 is similar to that heretofore described. Therefore the same reference numerals will be used to identify the same parts. In the embodiment of FIGS. 5 and 6, there is provided a pair of outer reactor grid screens 45 and 46 and an intermediate centrally positioned reactor grid screen 47, all located within the expansion chamber 32. The outer screens 45 and 46 are positioned in the stream of fuel-air passing around the upper or upstream edges 27a, 28a, of the respective throttle butterfly valves 27 and 28. The central screen 47 is located to intercept the stream passing around the lower or downstream edges 27b, 28b of the throttle butterfly valves 27 and 28. In additioned the central screen 47 is positioned wherein it will intercept any stream crossing from the low speed side induction tube 18 through the inlet opening 39 of the manifold, which condition is most prominent when the engine is running at low speed with the high speed throttle valve 28 closed.

In the embodiment of FIGS. 5 and 6, all of the reactor grid screens 45, 46 and 47 are in the general shape of an inverted V, the apex of which is directed upstream, and end portions 45a, 46a, and 47a are distorted into general longitudinally extending tabs which are secured between the somewhat resilient structures of the spacer-insulator 13 and the housing 33 of the expansion chamber 32. Location of the grid screens 45, 46 and 47 within the expansion chamber creates minimum resistance to the air flow and provides a desirable cross-sectional area for air passage.

FIGS. 7 and 8 illustrate yet another embodiment having a different configuration of reactor grid screens and applied to the same structure as heretofore described. Accordingly identical parts of the embodiment of FIGS. 7 and 8 and the preceding embodiments will be identified by the same reference numerals. As therein illustrated, the reactor grid screens include the two outer screens 45 and 46 and an intermediate screen 48. The two outer screens 45 and 46 are positioned to intercept the flow of fuel-air passing along the upper or downstream edges 27a and 28a of the respective throttle butterfly valves 27 and 28. The central screen 48 is positioned to intercept any flow crossing over from the low speed induction tube 18 into the inlet opening 39, which condition is most prominently present when the throttle valve 28 in the high speed side 19 is closed.

As heretofore described the reactor grid screens 45 and 46 are in the shape of an inverted V, the apex of which is directed upstream. In addition the reactor grid screens 45 and 46 between the spacer-insulator 13 and the housing 33 of the expansion chamber 32. The central screen 48 is positioned generally between the high and low speed sides 18 and 19 of the carburetor 10 and is defined by a longitudinally extending ribbon, the transverse axis of which is vertical, to partially block the communication between the low speed side and the high speed side of the carburetor 10 and manifold inlet openings 38 and 39. The central screen 48 is also provided with end tabs 48a formed by twisting of the ribbonlike structure, and secured between the spacer-insulator 13 and the housing 33 of the expansion chamber 32.

FIG. 9 illustrates an embodiment of the invention, similar to that of FIGS. 5 and 6, wherein a supplemental draft tube is added to the expansion chamber to aid in breaking up the fuel particles. More specifically there is provided a supplemental draft tube 50 extending all along the low speed side of the reactor grid screen 47, transverse of the carburetor 10. A longitudinal slot 51 in the wall of the tube opens upstream of the fuel-air flow. The tube is adapted (not shown) to be connected to a source of air, such as a supply of air from the filtered air inlet in the air filter. A sufficient pressure differential will exist between the air inlet of the air filter and the high velocity air in the carburetor induction tubes to promote a flow of supplemental air. This supplemental air will effectively cause turbulence and further assist in vaporizing and breaking up large fuel particles.

From the above descriptions of the embodiments of FIG. 5 through 9, it will be apparent that these embodiments function and operate in like manner as the embodiment of FIGS. 1 through 4, providing improved economy and cleaner burning of fuel supplied to an internal combustion engine.

Referring now to the embodiments of FIGS. 10 and 11 there is illustrated an internal combustion engine 54, embodying the present invention. As illustrated the engine 54 is of a conventional V-shape, but the invention is equally applicable to engines of other configurations. The embodiments of FIGS. 10 and 11 use the same reactor grid screens and similar other structures as heretofore described, and accordingly identical parts have the embodiment of FIGS. 10 and 11 and the preceding embodiments will be identified by the same reference numerals. The engine 54, as is well known, includes the intake manifold 11, and a pair of opposed exhaust manifolds 55. An improved carburetor 10a according to the present invention is connected to the intake manifold 11 for providing the proper air-fuel mixture. A conventional air cleaner 56 is provided on the intake side of the carburetor 10. Moreover modern internal combustion engines, particularly of the type which are used for vehicle propulsion, require certain auxiliary equipment and modifications to reduce pollution from the engine. Such apparatus may take a variety of forms. In one type of pollution control apparatus, a positive crank case ventilation device 57 connects the air induction system with the crank case to recirculate vaporized petroleum products. In a conventional V-shaped automotive engine, the valves for the cylinders are normally within heads 54a of the engine 54, and the valves of the engine are covered by a pair of valve covers 58. Under such an arrangement, the positive crank case ventilation device frequently opens into one of the valve covers 58, as illustrated in FIG. 10.

Referring now to FIG. 10 in the illustrated embodiment the carburetor 10a is mounted on the intake manifold 11 by the spacer-insulator block 13 in a known manner. The carburetor 10a may be of any suitable type, and in the illustrated embodiment is of the multi-barrel aspiration type similar to those heretofore described, and including the low speed side or induction tube 18 and the high speed side or induction tube 19. Conventionally, the low speed side (sometimes both sides) contains a choke valve in the inlet side of the induction tube as heretofore described, but in the illustrated embodiment the induction tubes 18 and 19 are free of choke devices. Airflow through the induction tubes 18 and 19 create an aspiration of fuel through a pair of fuel jets 21a and 22a, each of which opens within an induction or aspiration nozzle or venturi 24 and 25 flush with the inside surface thereof. Each of the induction tubes 18 and 19 is controlled respectively by the throttle valve 27 and 28, here shown of the butterfly type positioned on the downstream side of the venturis 24 and 25. Fuel is supplied to the respective fuel jets 21a, 22a from respective float chambers 60, 61 through a passageway 62, 63, each of which includes a metering jet 64, 65 to control the fuel flow to the fuel jets 21a and 22a. The metering jets 64 and 65 conventionally may be of an interchangeable type so that the size of the opening therethrough between the passageways 62 and 63 with the respective float chambers 60 and 61 may be selectively controlled. Alternatively, the metering jets 64 and 65 may be variable in a known manner such as with a needle valve. In any event the metering jets 64 and 65 regulate the fuel flow through the passageways 62 and 63.

In accordance with the present invention the expansion chamber 32 is defined in the passageway 12 by the housing 33. Suitable reactor grids are placed in a plane approximately perpendicular to the direction of flow of the fuel-air mixture intercepting the streams of the larger sized particles of fuel as heretofore described. In the illustrated embodiment such reactor grids include the pair of outer reactor grids screens 45 and 46 and the intermediate centrally positioned reactor grid screen 37, all located within the entrance to the expansion chamber 32 as heretofore described. The reactor grid screens 45 and 46 are in the general shape of an inverted V, the apex of which is directed upstream, while the reactor grids crane 37 is in the general shape of a V, the apex of which is directed downstream. These screens 45, 37 and 46 are secured between the somewhat resilient structures of the spacer-insulator 13 and housing 33 of the expansion chamber 32 in a manner heretofore described.

In accordance with the present invention the air cleaner 56 is arranged to remove any obstructions to the air flow in the air intake system which would adversely affect economy of operation. To this end there is provided a somewhat conventional arrangement of air cleaner having an upper cup-shaped housing 66 including a cover 66a. The housing 66 may be secured to the upper or horn portion of the carburetor 10a by a suitable clamp ring 67, and the cover 66a may be secured 64 and 65 regulate the fuel flow through the passageways 62 and 63.

In accordance with the present invention the expansion chamber 32 is defined in the passageway 12 by the housing 33. Suitable reactor grids are placed in a plane approximately perpendicular to the direction of flow of the fuel-air mixture intercepting the streams of the larger sized particles of fuel as heretofore described. In the illustrated embodiment such reactor grids include the pair of outer reactor grids screens 45 and 46 and the intermediate centrally positioned reactor grid screen 37, all located within the expansion chamber 32 as heretofore described. The reactor grid screens 45 and 46 are in the general shape of an inverted V, the apex of which is directed upstream, while the reactor grids crane 37 is in the general shape of a V, the apex of which is directed downstream. These screens 45, 37 and 46 are secured between the somewhat resilient structures of the spacer-insulator 13 and housing 33 of the expansion chamber 32 in a manner heretofore described.

In accordance with the present invention the air cleaner 56 is arranged to remove any obstructions to the air flow in the air intake system which would adversely affect economy of operation. To this end there is provided a somewhat conventional arrangement of air cleaner having an upper cup-shaped housing 66 including a cover 66a. The housing 66 may be secured to the upper or horn portion of the carburetor 10a by a suitable clamp ring 67, and the 66a may be secured the inner chamber 70b of the air cleaner 56.

Advantageously an improvement according to the embodiment of FIGS. 10 and 11, by improving the mixing, improves engine operation and permits the reduction in the amount of needed fuel controlled by the metering jets 64 and 65. Thus the size of the conventional metering jets may be substantially reduced while obtaining proper smoothness and power with the accompanying more complete and economical combustion of the fuel. Moreover, turbulence from internal parts of the air passage and induction tubes has been minimized and the adverse effect on the economy of operation has been reduced. Thus the removal of the choke rod and butterfly valve from the induction tubes or entrance to the carburetor induction tubes, and relocation to some less significant area, improves the air flow to the air intake arrangement and minimizes turbulence. The air flow passage is further cleaned up by removal of any obstructions such as supporting structures within the air chamber and termination of the fuel jets on the inner surface of the venturis. Moreover, relocation of the crank case ventilation control to the downstream side of the air cleaner element minimizes contamination and blockage of the air cleaner element.

Although the present invention has been described by reference to several embodiments thereof, it will be apparent that numerous modifications and other embodiments may be devised by those skilled in the art. It is intended by the appended claims to cover all modifications and embodiments which will fall within the true spirit and scope of the present invention.

What is claimed as new and desired to be secured by Letters Patent of the United States is:

1. In an internal combustion engine having a carburetor and an intake manifold, said carburetor having at least a pair of induction tubes wherein fuel is combined with air to provide a fuel-air mixture, each of said induction tubes having a butterfly type throttle valve having upper and lower edge portions controlling the flow of said fuel-air mixture, said throttle valves opening about parallel axes and said carburetor providing a flow of fuel-air mixture having stream portions with larger sized particles of fuel moving around at least one of said edge portions:
    means defining a passageway between said intake manifold and said carburetor for the flow of a fuel-air mixture therethrough; and
    reactor grid means lying in a plane approximately perpendicular to the direction of flow of said fuel-air mixture positioned partially thereacross intercepting said stream portions,
    said reactor grid means including a center grid intercepting the flow from one edge portion of each of said throttle valves, and a pair of outwardly spaced grids intercepting flow around the other edge portions of the respective throttle valves.

2. The improvement defined in claim 1 wherein an expansion chamber is provided in said passageway, said grids being positioned at least partially in said expansion chamber.

3. The improvement defined in claim 2 wherein said center grid is in the form of a V with the apex thereof downstream.

4. The improvement defined in claim 2 wherein said center grid is in the form of a V with apex thereof upstream.

5. The improvement defined in claim 2 wherein said center grid is in the form of planar strip having its transverse axis parallel to the flow partially dividing the expansion area between said induction tubes.

6. The improvement defined in claim 2 wherein said outwardly spaced grids are in the form of a V with the apex thereof upstream.

7. The improvement defined in claim 2 wherein said outwardly spaced grids are in the form of a strip having its transverse axis transverse to the flow.

8. The improvement defined in claim 2 wherein there is provided means for regrouping the flow from said expansion chamber into the manifold.

9. The improvement defined in claim 1 including means for directing a stream of air in an upstream direction along at least one of said grids intercepting the downstream flow from the throttle valve.

10. The improvement defined in claim 9 wherein said means includes a tubular member in close proximity to the last mentioned grid having a slot in its upstream edge and adapted to be connected to a source of air.

11. In an internal combustion engine having a carburetor and an intake manifold, said carburetor having an induction tube wherein fuel is combined with air to provide a fuel-air mixture, said induction tube having a butterfly type throttle valve having upper and lower edge portions controlling the flow of said fuel-air mixture, said carburetor providing a flow of fuel-air mixture having stream portions with larger sized particles of fuel moving around at least one of said edge portions:
    means defining a passageway between said intake manifold and said induction tube for the flow of a fuel-air mixture therethrough;
    reactor grid means positioned downstream of said throttle valve and arranged to intercept said stream portions and reduce the size of said larger sized fuel particles; and
    means defining an expansion chamber within said passageway of substantially greater volume per unit length than said induction tube and positioned in the vicinity of said reactor grid means;
    whereby said fuel particles of reduced size are mixed with air in said expansion chamber to provide a more uniform fuel-air mixture at said intake manifold while at the same time providing a relatively large volume into which said induction tube discharges to permit rapid increase in speed without sacrificing normal aspiration requirements.

12. The combination defined in claim 11, wherein the cross-sectional area of said expansion chamber is approximately double the cross-sectional area of said induction tube.

13. The combination of claim 11 wherein said reactor grid means is formed of fine mesh.

14. The combination of claim 11, wherein there is provided regrouping means positioned between said expansion chamber and said intake manifold, thereby to increase the velocity of said uniform fuel-air mixture prior to entry thereof into said intake manifold.

15. The combination of claim 11, which includes means defining an opening between said expansion chamber and said intake manifold, said opening having a cross section which gradually decreases in the direction of said intake manifold.

* * * * *